(12) United States Patent
Holmberg

(10) Patent No.: US 6,241,216 B1
(45) Date of Patent: Jun. 5, 2001

(54) TREE LINE FENCING SYSTEM

(76) Inventor: Douglas A. Holmberg, 13430 Hobson Simmons Rd., Lithia, FL (US) 33547

( * ) Notice: Subject to any disclaimer, the term of this patent is extended or adjusted under 35 U.S.C. 154(b) by 0 days.

(21) Appl. No.: 09/406,180

(22) Filed: Sep. 24, 1999

(51) Int. Cl.[7] .............................. B21F 27/00; E04H 17/02
(52) U.S. Cl. ........................................... 256/32; 256/19
(58) Field of Search .......................................... 256/32, 19

(56) References Cited

U.S. PATENT DOCUMENTS

| | | | | |
|---|---|---|---|---|
| 66,601 | * | 7/1867 | Lockwood | 256/48 |
| 323,032 | * | 7/1885 | Ferguson | 256/23 |
| 3,690,618 | * | 9/1972 | Shettel | 256/10 |
| 5,435,097 | * | 7/1995 | Harper | 47/43 |
| 6,073,391 | * | 6/2000 | Tort et al. | 47/42 |

* cited by examiner

Primary Examiner—Lynne H. Browne
Assistant Examiner—John B. Walsh
(74) Attorney, Agent, or Firm—A. W. Fisher, III

(57) ABSTRACT

A tree line fence system for use with a tree line comprising a plurality of trees to be harvested comprising a plurality of fencing members affixed to the tree trunks of each tree along the tree line to support a plurality of corresponding fencing elements wherein each fencing member comprises a fencing nail having a fencing element attachment means formed on the proximal end thereof to operatively receive and support the plurality of fencing elements thereon and a fencing member attachment means formed on the distal end portion thereof to anchor or secure the fencing members to the corresponding tree trunks to affix the tree line fence system to the tree trunks along the tree line.

15 Claims, 3 Drawing Sheets

TREE LINE FENCING SYSTEM

BACKGROUND OF THE INVENTION

1. Field of the Invention

A tree fence system for use with a tree line to be harvested.

2. Description of the Prior Art

Simplicity of installation and reduced costs are important aspects in the construction of a fence line. Equally important in the design of a fencing system is the safety of harvesting and processing timber the has become part of the fence line as the trees grow into a portion of the fence.

U.S. Pat. No. 3,690,618 shows a wire fencing system along a plurality of spaced posts serving as the terminal and intermediate support means defining a fencing span as part of a fence line comprising a strand with protuberance means spaced therealong serving as a conductor when electrically charged to deliver a shock to objects coming in contact with the fencing. A terminal insulator means secured to the posts maintaining fence span tension includes a groove means penetrating the surface thereof to a depth permitting the selective containment of the strand. An intermediate carrier means engaging with the posts for the intermediate support of the strand, comprising a spike with an open clevis head means to selectively receiving the strand. The spike is driven to close the clevis against the post surface for the containment of the strand while permitting longitudinal movement.

U.S. Pat. No. 66,601 discloses a nail having a hole or holes having rounded edges used in the construction of fences, trellis-work, verandas and the like where the rounded edges to permit the wire to pass freely through the hole.

U.S. Pat. No. 323,032 describes a fence comprising a plurality of upright posts including notches or incisions formed therein with staples to support a longitudinal barbed top wire extending along the posts. Panels comprising rails are secured by the wire strands having their top ends intertwisted under and above the top wire.

Thus it can be seen there is a need for an inexpensive fencing system for use with a tree line to be harvested without implanting foreign objects into the trees that could endanger workers harvesting and/or processing the timber.

SUMMARY OF THE INVENTION

The present invention relates to a tree line fence system for use with a tree line of a plurality of trees to be harvested comprising a plurality of fencing members affixed to the tree trunks along the tree line to support a plurality of corresponding fencing elements.

Each fencing member comprises an elongated fencing nail having a fencing element attachment means formed on the proximal end portion thereof to operatively receive and support the fencing elements and a fencing member attachment means formed on the distal end portion thereof to anchor or secure the fencing members to the corresponding tree trunks to affix the tree line fence system to the tree trunks along the tree line.

Each fencing element attachment means comprises a fencing element access slot terminating in a fencing element retention channel. Each fencing member attachment means comprises reduced tree trunk engaging section terminating in a tapered tip portion on the outer end thereof.

Each fencing element comprises an elongated wire or thread-like flexible member.

To assemble the tree line fence system along a tree line, a plurality of fencing member attachment recesses are formed in each tree trunk corresponding to the number of fencing elements intended to be strung or attached to the fencing members. The fencing members are then anchored or secured to the individual tree trunks by placing each fencing member attachment means into the corresponding fencing member attachment recess.

Once the plurality of fencing members are secured in place within the corresponding plurality of fencing member attachment recesses, the plurality of fencing elements are attached thereto. Specifically, the lower most fencing element is coupled to the lower most row of the fencing members. The fencing element is aligned with each of the fencing element access slots and then moved downward into the corresponding fencing element retention channels to maintain the lower most fencing element in operative relationship relative to the lower most row of the fencing members. So positioned, opposite ends of the lower most fencing element are anchored to secure the lower most fencing element in place.

An intermediate and upper most fencing elements are similarly positioned and anchored in place. Thus assembled, the plurality of fencing members and the plurality of fencing elements cooperatively form the tree line fence system with the plurality of trees.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
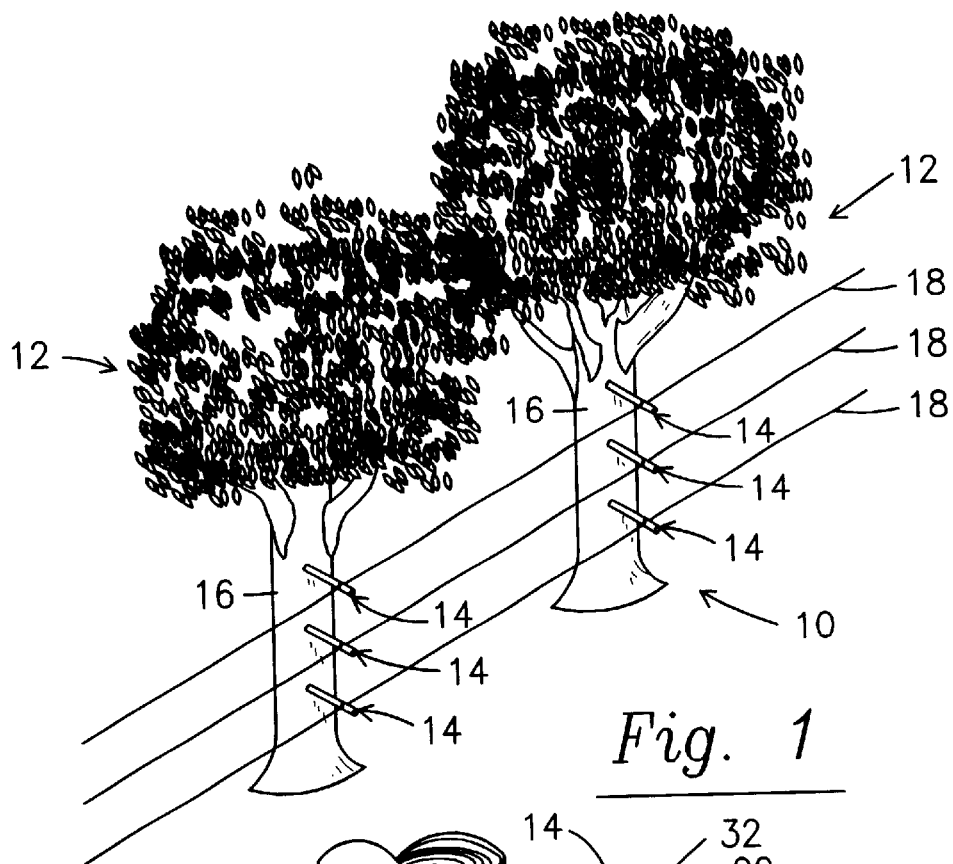
FIG. 1 is a perspective view of the tree line fence system of the present invention.

As best shown in FIG. 1, the present invention relates to a tree line fence system generally indicated as 10 for use with a tree line comprising a plurality of trees each generally indicated as 12 to be harvested. The tree line fence system 10 comprises a plurality of fencing members each generally indicated as 14 affixed to the tree trunks 16 of each tree 12 along the tree line to support a plurality of corresponding fencing elements each indicated as 18.

Figure 2:
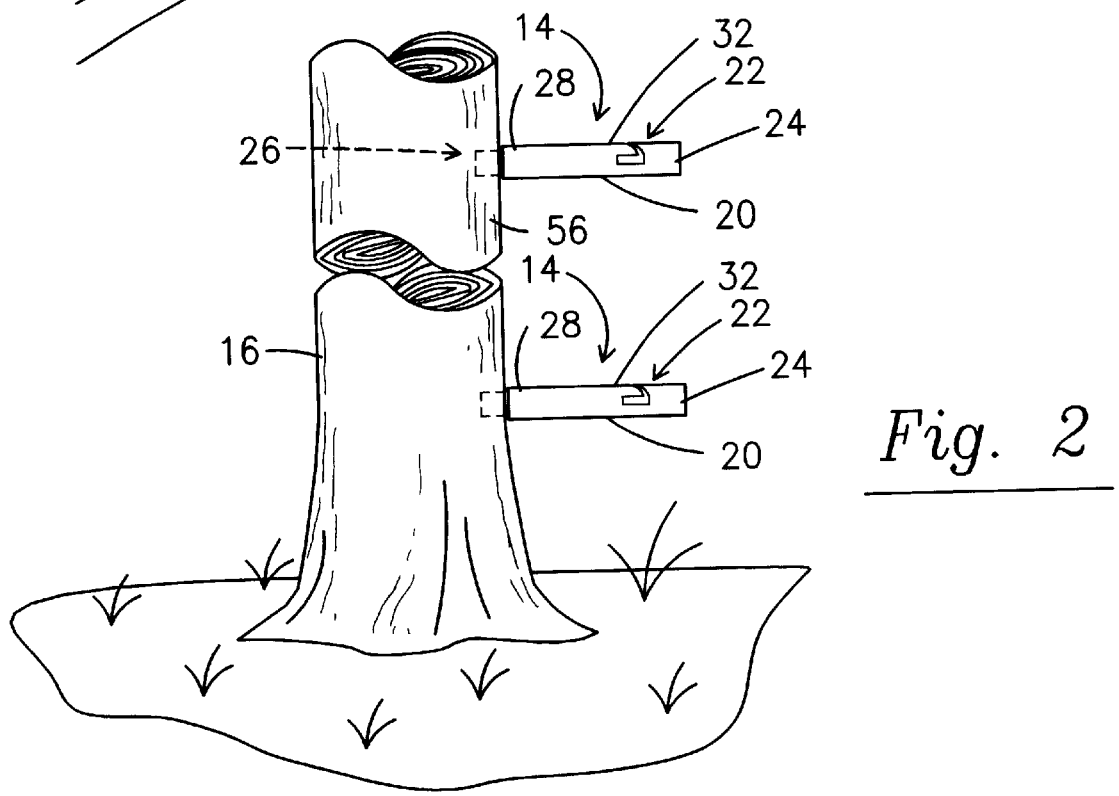
FIG. 2 is a side view of the fencing members of the present invention.
Figure 3:
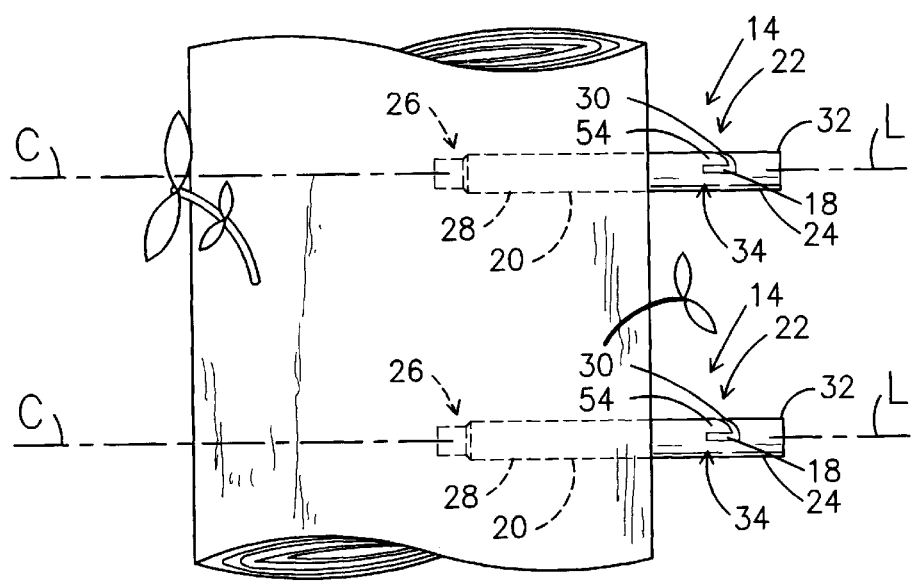
FIG. 3 is a detailed side view of the fencing members of the present invention.
Figure 4:
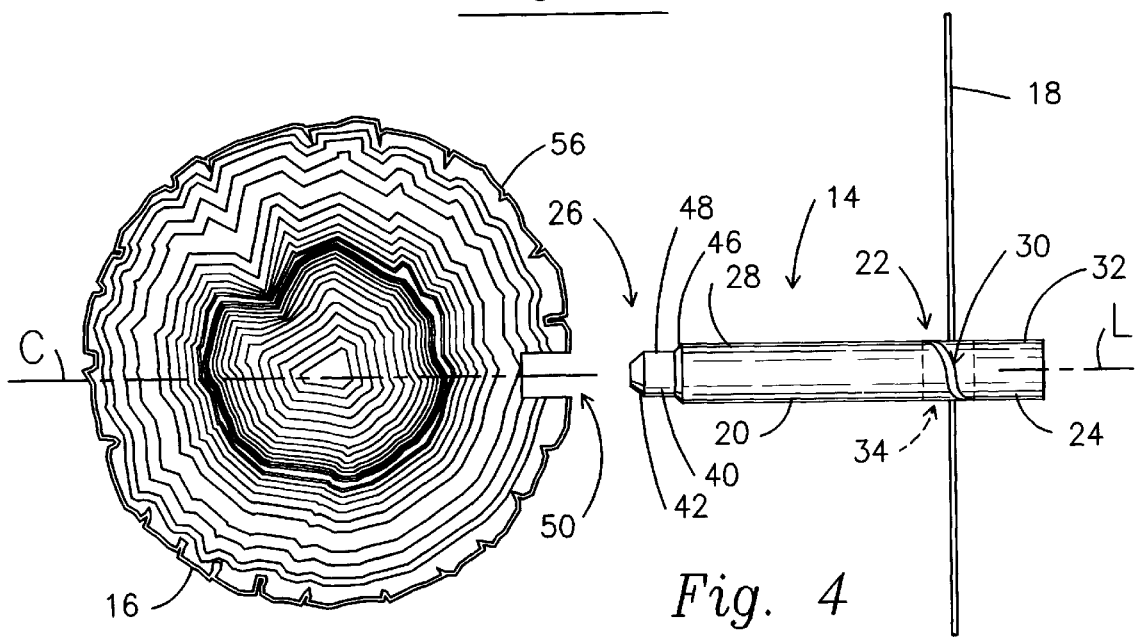
FIG. 4 is a top view of a fencing member of the present invention.

As best shown in FIGS. 2 through 4, each fencing member 14 comprises an elongated substantially cylindrical fencing nail 20 having a fencing element attachment means generally indicated as 22 formed on the proximal end portion 24 thereof to operatively receive and support the fencing elements 18 and a fencing member attachment means generally indicated as 26 formed on the distal end portion 28 thereof to anchor or secure the fencing members 14 to the corresponding tree trunks 16 to affix the tree line fence system 10 to the tree trunks 16 along the tree line.

Figure 5:
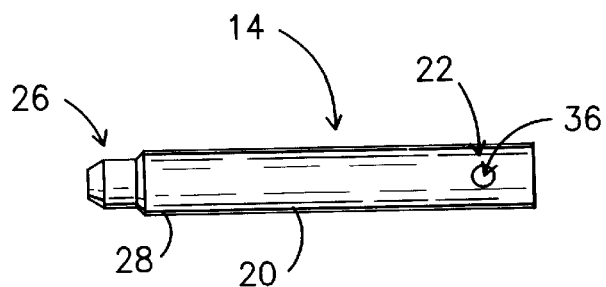
FIG. 5 is a side view of an alternate embodiment of the fencing member of the present invention.
Figure 6:
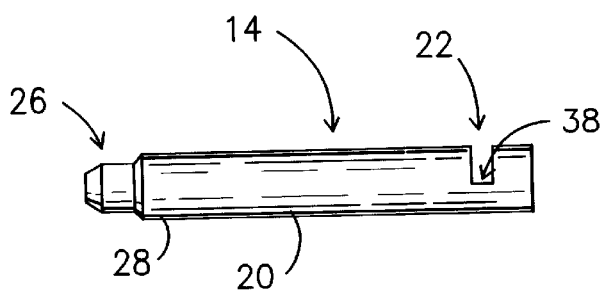
FIG. 6 is a side view of the alternate embodiment of the fencing member of the present invention.

As best shown in FIGS. 3 and 4, each fencing element attachment means 22 comprises a substantially vertical fencing element access slot or groove 30 formed in the upper surface 32 of the elongated substantially cylindrical fencing nail 20 and inclined relative to the longitudinal centerline CL thereof terminating in a substantially horizontal fencing element retention channel 34 formed in the center portion of the elongated substantially cylindrical fencing nail 20. Of course, the fencing element attachment means 22 may comprise an aperture 36 or open slot 38 as shown in FIGS. 5 and 6 respectively.

As best shown in FIGS. 3 and 4, each fencing member attachment means 26 comprises a substantially cylindrical reduced tree trunk engaging section 40 terminating in a tapered tip portion 42 on the outer end thereof and having a beveled surface 46 formed on the opposite or inner end 48 thereof. Each fencing member attachment means 26 is substantially cylindrical in shape to operatively mate with a corresponding substantially cylindrical attachment recess 50 preferably from about 2 inches to about 6 inches in depth formed in each tree trunk 16 as described more fully hereinafter. Thus the fencing member attachment means 26 may be rectilinear in shape with a correspondingly shaped recess 50 such as a square or triangular configuration. Each fencing member 14 is preferably constructed from wood but may be constructed from plastic or other suitable material not to damage the trees or be dangerous to cut or otherwise harvest or process.

The fencing elements 18 may comprise a wire stand, barbed wire, plastic or other suitable flexible materials.

Figure 7:
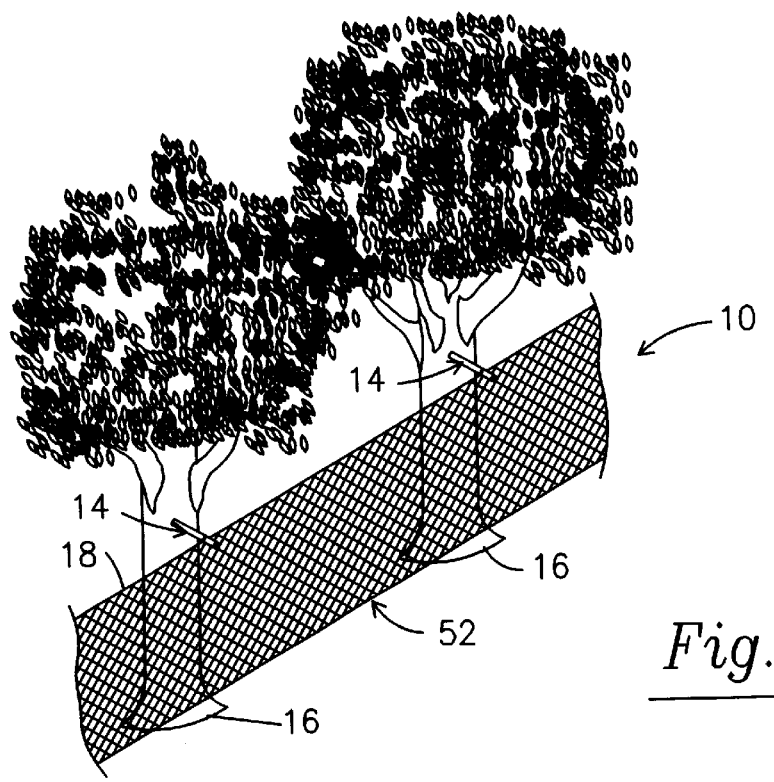
FIG. 7 is a perspective view of an alternate embodiment of the tree line fence system of the present invention.

FIG. 7 shows an alternative embodiment of the tree line fence system 10 where a chain link fence generally indicated as 52 or similar fencing barrier is hung from a single fencing element 18.

To assemble the tree line fence system 10 along a tree line, a plurality of substantially cylindrical fencing member attachment recesses 50 are formed in each tree trunk 16 corresponding to the number of fencing elements 18 intended to be strung or attached to the fencing members 14. The fencing members 14 are then anchored or secured to the individual tree trunks 16 by placing each fencing member attachment means 26 into the corresponding substantially cylindrical fencing member attachment recess 50 and tapping of hammering the fencing members 14 into the corresponding substantially cylindrical fencing member attachment recess 50 and tapping or hammering the fencing members 14 into the corresponding substantially cylindrical fencing member attachment recess 50 and tapping or hammering the fencing members 14 into corresponding substantially cylindrical fencing member attachment recess 50. The diameter of each substantially cylindrical fencing member attachment recess 50 is less than the diameter of the corresponding substantially cylindrical reduced tree trunk engaging section 40 of the fencing member attachment means 26 and greater than the diameter of the corresponding tapered tip portion 42 such that each substantially cylindrical reduced tree trunk engaging section 40 is press-fit into the corresponding substantially cylindrical fencing member attachment recess 50 until each beveled surface 46 is at least partially disposed within the corresponding substantially cylindrical fencing member attachment recess 50. Once the plurality of fencing members 14 are secured in place within the corresponding plurality of substantially cylindrical fencing member attachment recesses 50, the plurality of fencing elements 18 are attached thereto. Specifically, the lower most fencing element 18 is coupled to the lower most row of the fencing members 14. The fencing element 18 is aligned with each of the substantially vertical fencing element access slots or grooves 30 and then moved downward into the corresponding substantially horizontal fencing element retention channels 34 to maintain the lower most fencing element 18 in operative relationship relative to the lower most row of the fencing members 14. The overhang retention ledge and tab 54 formed over each substantially horizontal fencing element retention channel 34 retains the fencing element 18 therein. So positioned, opposite ends of the lower most fencing element 18 are anchored to secure the lower most fencing element 18 in place.

The intermediate and upper most fencing elements 18 are similarly positioned and anchored in place. Thus assembled, the plurality of fencing members 14 and the plurality of fencing elements 18 cooperatively form the tree line fence system 10 with the plurality of trees 12. Preferably, the elongated substantially cylindrical fencing nails 20 is preferably about 8 inches to about 24 inches. Thus, there is sufficient clearance or distance between the outer surface 56 of each tree trunk 16 and the corresponding plurality of fencing element attachment means 22 to allow growth of the trees 12 without touching or engaging the plurality of fencing elements 18 permitting the harvesting of mature trees 12 without the danger of cutting into the fencing elements 18.

Tree line fence systems 10 employing the alternate embodiments of the fencing element attachment means 22 shown in FIGS. 5 and 6 including an aperture 36 and open slot 38 respectively are similarly assembled.

To assembly the alternate embodiment of the tree line fencing system 10 shown in FIG. 7, a single row of fencing members 14 and a corresponding fencing element 18 are secured to the tree trunks 16. The fencing barrier 52 is then hung or secured to the fencing element 18 to cooperatively form the tree line fencing system 10 with the trees 12.

As shown in FIG. 6, a major portion of the elongated substantially cylindrical fencing rail 20 may be tapered rather than only the distal end portion thereof.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A tree line fence system for use with a tree line comprising a plurality of trees each having a tree trunk, said tree line fence system comprises a plurality of fencing members affixed to the tree trunks of at least some of the trees along the tree line to support a plurality of corresponding fencing elements wherein each said fencing member comprises a fencing nail having a fencing element attachment means formed on the proximal end thereof to operatively receive and support said fencing elements, each said fencing element attachment means comprises a fencing element access slot formed in said fencing nail, terminating in a fencing element retention channel formed in the center portion of said fencing nail, and a fencing member attachment means formed on the distal end portion thereof to secure said fencing members to the corresponding tree trunks to affix said tree line fence system to the tree trunks along the tree line.

2. The tree line fence system of claim 1, wherein each said fencing element attachment means further includes a retention tab to retain said corresponding fencing element within said fencing element retention channel.

3. The tree line fence system of claim 1 wherein the fencing element access slot is inclined relative to the longitudinal centerline of said fencing nail.

4. The tree line fence system of claim 1 wherein each said fencing element comprises a flexible elongated member.

5. The tree line fence system of claim 1 wherein each said fencing member attachment means comprises a reduced tree trunk engaging section.

6. The tree line fence system of claim 5 wherein each said tree trunk engaging section includes a beveled surface formed on the inner end thereof.

7. The tree line fence system of claim 5 wherein each said reduced tree trunk engaging section terminates in a tapered tip portion.

8. The tree line fence system of claim 7 wherein each said tree trunk engaging section further includes a beveled surface formed on the inner end thereof.

9. A tree line fence system for use with a tree line comprising a plurality of trees each having a tree trunk, said tree line fence system comprises a plurality of fencing members affixed to the tree trunks of at least some of the trees along the tree line to support a plurality of corresponding fencing elements wherein each said fencing member comprises a fencing nail having a fencing element attachment means formed on the proximal end thereof to operatively receive and support said fencing elements, each said fencing element attachment means comprises a fencing element access slot formed in said fencing nail terminating in a fencing element retention channel formed in the center portion of said fencing nail and a retention tab to retain said corresponding fencing element within said fencing element retention channel, and a fencing member attachment means formed on the distal end portion thereof to secure said fencing members to the corresponding tree trunks to affix said tree line fence system to the tree trunks along the tree line.

10. The tree line fence system of claim 9 wherein the fencing element access slot is inclined relative to the longitudinal centerline of said fencing nail.

11. The tree line fence system of claim 9 wherein each said fencing member attachment means comprises a reduced tree trunk engaging section.

12. The tree line fence system of claim 11 wherein each said tree trunk engaging section includes a beveled surface formed on the inner end thereof.

13. The tree line fence system of claim 11 wherein each said reduced tree trunk engaging section terminates in a tapered tip portion.

14. The tree line fence system of claim 13 wherein each said tree trunk engaging section further includes a beveled surface formed on the inner end thereof.

15. The tree line fence system of claim 9 wherein each said fencing element comprises a flexible elongated member.

* * * * *